No. 699,115. Patented Apr. 29, 1902.
E. REAGAN.
PROCESS OF BALING COTTON.
(Application filed Dec. 26, 1901.)
(No Model.)
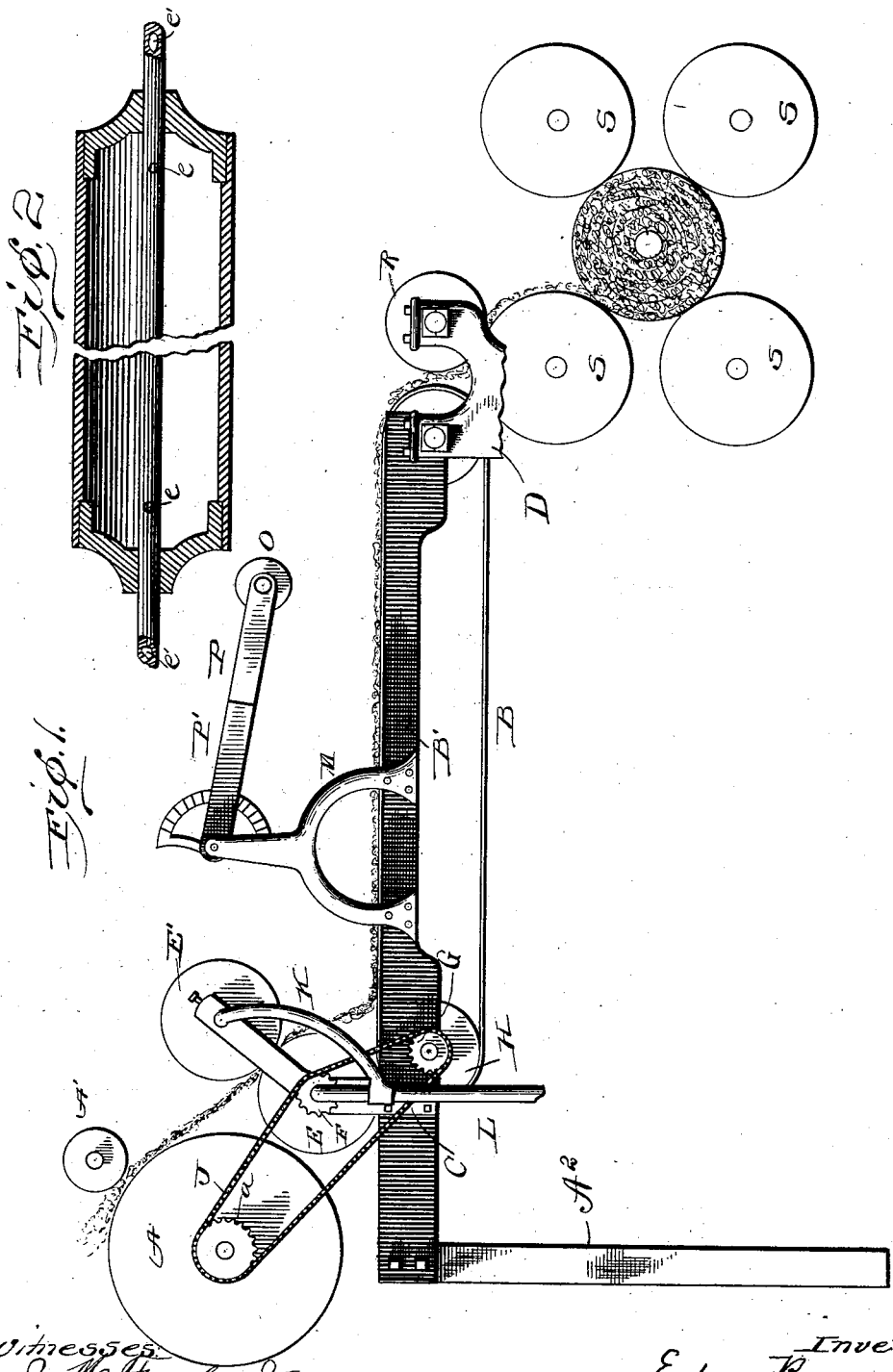

UNITED STATES PATENT OFFICE.

EDGAR REAGAN, OF FLORESVILLE, TEXAS, ASSIGNOR OF ONE-HALF TO WILBUR C. BRUFF, OF FLORESVILLE, TEXAS.

PROCESS OF BALING COTTON.

SPECIFICATION forming part of Letters Patent No. 699,115, dated April 29, 1902.

Application filed December 26, 1901. Serial No. 87,232. (No model.)

*To all whom it may concern:*

Be it known that I, EDGAR REAGAN, a citizen of the United States, residing at Floresville, in the county of Wilson and State of Texas, have invented a certain new and Improved Process of Baling Cotton; and I do hereby declare the following to be a full, clear, and exact description of the invention, such as will enable others skilled in the art to which it appertains to make and use the same.

My invention relates to a new and improved process of baling cotton.

In baling cotton it has been found advantageous to heat the cotton-bat in order to evaporate the moisture therein. Heretofore the cotton-bat has been heated by applying heat to one of the pressing-rollers, and the bat thus heated is compressed at the first stage in the process. Immediately after this compression and before the bat has had time to dry it is packed in bale form. Thus the cotton is baled while still moist, which injures the fiber, especially that part which is located near the center of the bale.

Now the object of my invention is to provide an improved method of baling whereby the cotton is heated as it leaves the gin-condenser and then subjected to dry air to relieve it of moisture before reaching the pressing-rollers. Thus I first heat the cotton, then subject it to dry air, while the final step in my process is to compress the cotton after it has been heated and dried.

In carrying out my invention I provide rollers arranged adjacent to the gin for heating the cotton as it leaves the condenser without substantial compression. The heated cotton is then exposed to the action of dry air on an endless carrier to take up the moisture and conducted by said carrier either to an accumulator-roll or to the pressing-rollers. Between the heating-rollers and the pressing-rollers in the path of said carrier I arrange an accumulator-roll to take up the heated cotton when the press is stopped to remove a completed bale. By this arrangement of the accumulator-roll the heated cotton wound thereon has a much longer exposure to the dry air. This is of especial importance, for when the press is again started the cotton thus accumulated and dried is the first fed to the press and forms the central or inner portion of the bale. The air in the pressroom must be kept dry.

The character of press to which my method of baling is best adapted is the roller-press for forming cylindrical cotton-bales. A type of such press is shown in my application for Letters Patent filed in the United States Patent Office May 16, 1901, Serial No. 60,478.

In the accompanying drawings, Figure 1 is a diagrammatic view in side elevation, showing a portion of a gin-condenser delivering cotton-bat to heating-rollers, an accumulator-roll, and an endless carrier delivering cotton-bat to the pressing-rollers. Fig. 2 is a detail view in section, showing one of the pair of heating-rollers and axle therefor.

Referring more particularly to the drawings, A A' denote the condensing-rollers of the gin, one of which is provided with a sprocket-wheel $a$.

B denotes the endless carrier, and B' the endless carrier-frame, secured at one end to the gin-frame and supported at the other end by a frame D, forming a part of the stationary pressing-roller frame.

C denotes a support attached to the frame B', on which are journaled the hollow heating-rollers E E'.

F denotes a sprocket-wheel mounted on the axle of the roller E.

G denotes a sprocket-wheel mounted on the axle of the carrier-pulley H, which is journaled in the frame B'.

J denotes a sprocket-chain gearing with the wheels $a$, F, and G.

K denotes a hose or flexible pipe which connects the roller E' to a pipe L. The latter pipe conducts the exhaust-steam from the steam-pressure cylinder (not shown) which operates the movable pressing-rollers. Other mans may be employed, if desired, to furnish heat to the pipe L. The upper end of this pipe connects with the axle of roller E. As shown in Fig. 2, the axles of both rollers are provided with inlet-ports $e$, communicating with the interior of the cylinders to conduct the exhaust-steam thereto, and with outlet-ports $e'$, which allow the escape of the exhaust-steam. The latter ports have any suitable means, such as a rubber hose, to conduct the exhaust-steam from said rollers.

M denotes a stationary frame mounted on the frame B. The frame M serves as a support for any suitable mechanism for operating an accumulator-roll—such, for example, as a roll O, suspended from frames—such, for example, as frames P P. The roll O is shown in Fig. 1 as idle, the cotton it accumulated having just been discharged and incorporated in the forming bale.

R denotes a feed-roller, and S S S S the pressing-rollers, having between them the forming bale.

It will be seen that the cotton is first passed between the heating-rollers, which heats the cotton-bat on both sides. The heated cotton is then exposed on the carrier to the action of dry air while it is conveyed to the pressing-rollers. If the press is idle, the accumulator-roll is lowered in position on the carrier to accumulate the heated bat and hold it exposed to the action of the dry air until the press is again taking bat, when it is reversed and feeds its bat to the carrier. It is thus conducted to the press, where it is compressed in the forming bale and forms the inner part thereof. As I reserve the compression of the cotton-bat to the last step in the process, the cotton fiber is kept loose or incompact and freely admits the dry air through the bat, thus accelerating the evaporation of moisture therein.

Having thus shown and described my invention, what I claim, and desire to secure by Letters Patent, is—

1. The method of baling cotton which consists in heating the cotton-bat at a point between the gin-condenser and the pressing-rollers, exposing said heated bat while incompact to the action of dry air, and finally compressing said bat into bale form.

2. The method of baling cotton which consists in heating the cotton-bat at a point between the gin-condenser and the accumulator-roll, winding said bat on said roll and exposing it to the action of dry air, and feeding said bat to the press-rollers to form the interior of the bale.

In testimony whereof I affix my signature in presence of two witnesses.

EDGAR REAGAN.

Witnesses:
S. K. FRANKLIN,
JOHN GRIFFITH.